United States Patent [19]
Baker et al.

[11] Patent Number: 5,125,786
[45] Date of Patent: Jun. 30, 1992

[54] DEVICE FOR LIFTING MANHOLE COVERS

[76] Inventors: James J. Baker, 109 W. 7th, Owasso, Okla. 74055; Markey C. McNutt, 7501 S. Ash Ave., Broken Arrow, Okla. 74011

[21] Appl. No.: 785,517

[22] Filed: Oct. 31, 1991

[51] Int. Cl.⁵ .............................................. B66F 11/00
[52] U.S. Cl. .................. 414/684.3; 254/131; 280/47.24
[58] Field of Search .............. 414/680, 684.3; 294/15, 294/17; 280/47.24, 47.27; 254/131

[56] References Cited

U.S. PATENT DOCUMENTS 4,482,182 11/1984 Mortensen ............................ 294/15
5,004,282 4/1991 Perry ................................. 254/131 X

FOREIGN PATENT DOCUMENTS 1175849 8/1964 Fed. Rep. of Germany ...... 254/131
529915 2/1954 Italy ................................... 280/47.27

Primary Examiner—Robert J. Spar
Assistant Examiner—Donald W. Underwood
Attorney, Agent, or Firm—William S. Dorman; Molly D. McKay

[57] ABSTRACT

The invention is a dolly on wheels for lifting and moving manhole covers. The dolly has a pivotal sleeve into which a lifting bar fastens and a bottom plate with a crooked tail on its bottom side. The lifting bar has a pointed end which is used in conjunction with the bottom plate to lift small manhole covers and a finger end which is used in conjunction with the bottom plate and tail to lift large manhole covers.

6 Claims, 4 Drawing Sheets

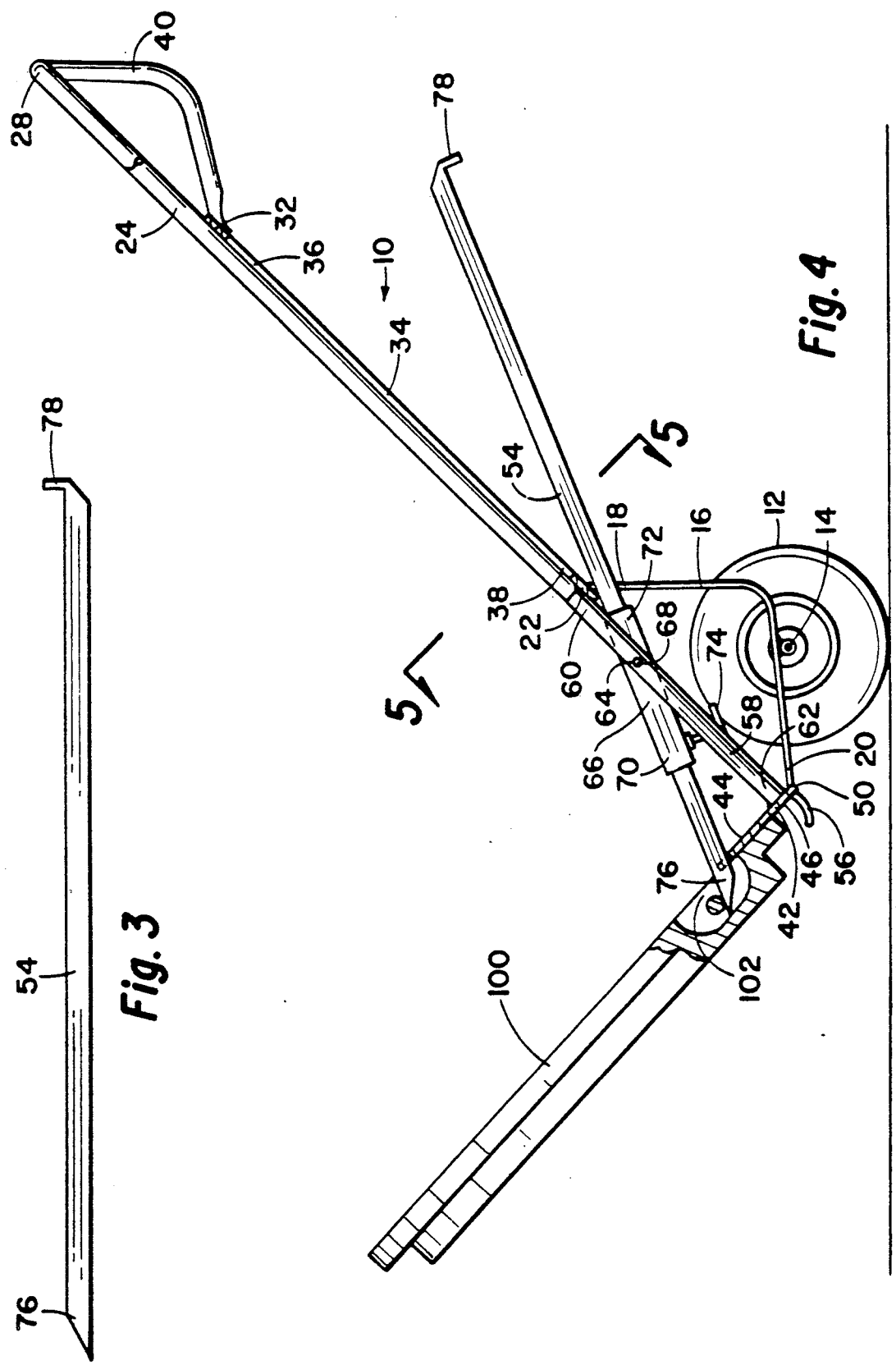

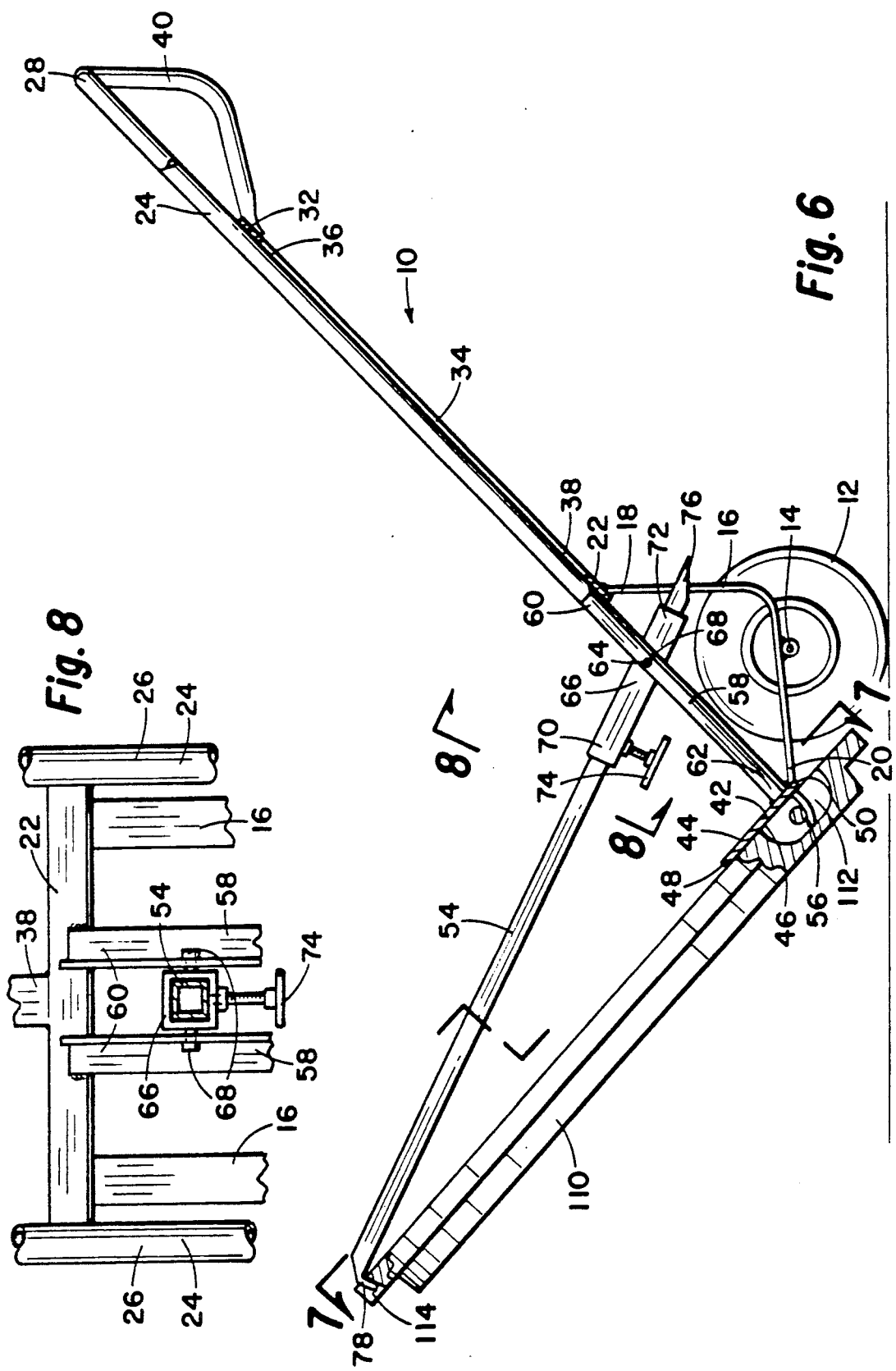

DEVICE FOR LIFTING MANHOLE COVERS

BACKGROUND OF THE INVENTION

1. Field of the Invention

The present invention relates to a new device for lifting and moving manhole covers. More particularly, the present invention relates to a dolly on wheels equipped with a pivotal sleeve into which a lift bar fastens and equipped with a bottom plate with a tail on its bottom side.

The lift bar has a pointed end and a finger end and can be inserted into the sleeve so that either end of the lift bar can be used in conjunction with the bottom plate and tail to engage and lift a manhole cover.

2. The Prior Art

With the advent of modern cities came underground utilities such as telephone, sewer and water. The need for access to these underground utilities mandated that they be designed with manholes. To prevent accidents and injury to pedestrians or vehicles moving on the sidewalks and streets, each manhole is provided with a cover. These manhole covers come in a variety of sizes, from small ones weighing only a few pounds, to large ones weighing several hundred pounds.

To gain access to a manhole requires first removing the manhole cover. Originally, manhole covers were removed by hand, using simple tools such as a pry bar or stick. Small, lightweight manhole covers could safely be removed this way. However, for larger and heavier manhole covers, this method presented a variety of safety problems including strained muscles experienced in removing the cover, mashed toes from moving it away from the manhole, and mashed fingers from replacing it on the manhole.

An early improvement on the simple pry bar can be seen in U.S. Pat. No. 2,086,318 where small wheels and adjustable gripper members were added to a simple pry bar. However, this invention still required the user to stoop down and exert a substantial upward pull on the end of the bar in order to lift a large manhole cover.

U.S. Pat. No. 4,482,182 added an upward oriented T-shaped handle to a pry bar to allow a person to lift a manhole cover without stooping over. However, that invention had no wheels and thus, the user had to drag the invention and the manhole cover once the manhole cover was lifted off of the manhole. Also, that invention did not adjust to fit different sizes of manholes.

Finally, U.S. Pat. No. 4,838,521 added small wheels, a telescoping T-shaped handle, adjustable grippers, and a pry bar which would lay near the handle in an inoperative, or storage, position. That invention, however, was not readily adjustable between widely varying sized manhole covers because of the fixed length of the shaft on which one set of grippers were attached. Each adjustment between very large and very small manhole covers required replacement of the shaft on the invention.

The present invention overcomes these problems by providing an inverted U-shaped frame and an L-shaped handle which can be used either together or alone to lift even large manhole covers without stooping or straining, large rubber wheels for easily moving the cover once it has been lifted, a lift bar which can be adjusted without tools to various lengths and can be reversed within a pivotal sleeve to employ a different gripper shape in lifting a manhole cover. Also, the lifting bar of the present invention stores against the frame for ease in transporting of the invention in an inoperative position.

SUMMARY OF THE INVENTION

Briefly, the present invention is directed to a new and improved device for lifting and moving large and small manhole covers. The device includes a frame with an upper end and a lower end. The upper end of the frame includes a handle. A bottom plate having a top side, a bottom side, a front edge and a back edge attaches on its top side to the lower end of the frame. A slot is included on the front edge of the bottom plate into which a lift bar can be inserted when lifting a small manhole cover. A tail is located on the bottom side and near the back edge of the bottom plate. An axle with two wheels is attached near the lower end of the frame. A pivotal sleeve into which a lift bar inserts and fastens is also attached to the frame near its lower end. One end of the lift bar is pointed for engaging a recess in a small manhole cover. The other end is finger shaped for engaging either a recess or a side slot in a large manhole cover.

BRIEF DESCRIPTION OF THE DRAWINGS

FIG. 3 is a side view of a lifting bar removed from a device for lifting manhole covers;

FIG. 4 is a side view of a device for lifting manhole covers shown lifting a small manhole cover taken along line 2—2 of FIG. 1;

FIG. 6 is a side view of a device for lifting manhole covers shown lifting a large manhole cover taken along line 2—2 of FIG. 1;

FIG. 8 is a cross sectional view of a device for lifting manhole covers taken along line 8—8 of FIG. 6.

DETAILED DESCRIPTION OF THE PREFERRED EMBODIMENTS

Figure 1:
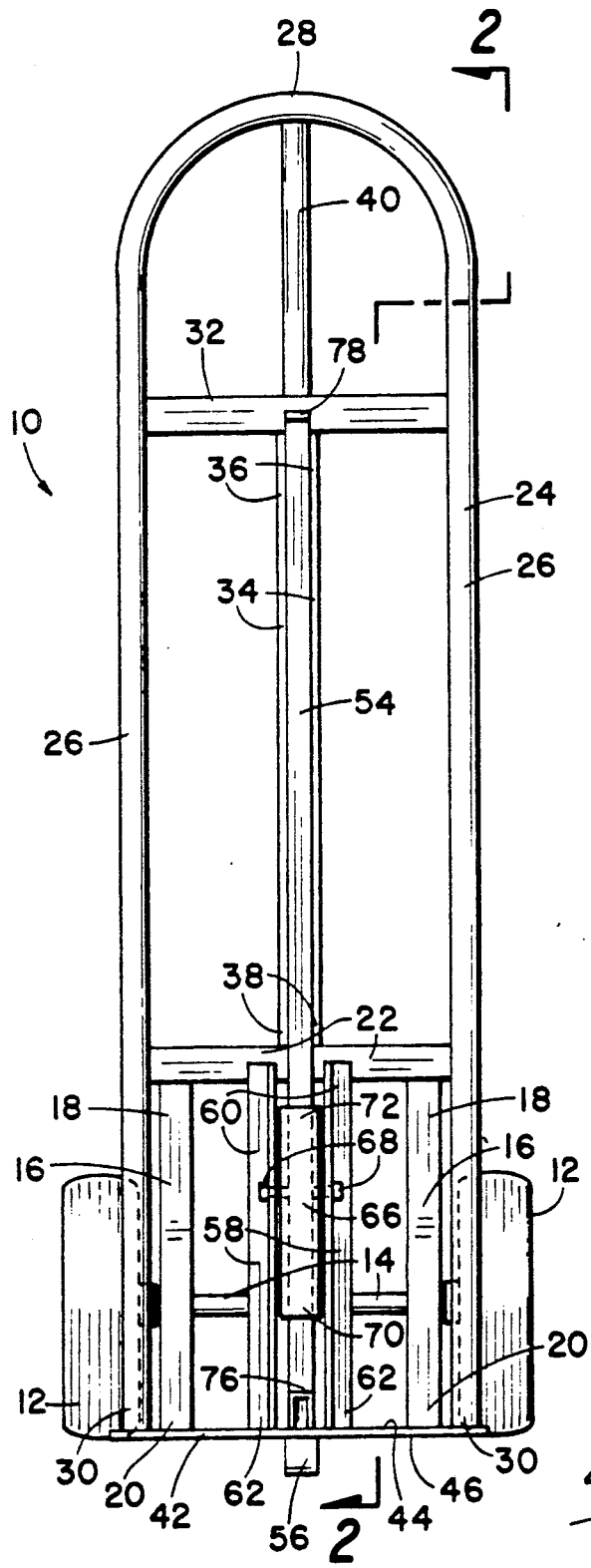
FIG. 1 is a front view of a preferred embodiment of a device for lifting manhole covers constructed in accordance with the principles taught by the present invention.
Figure 2:
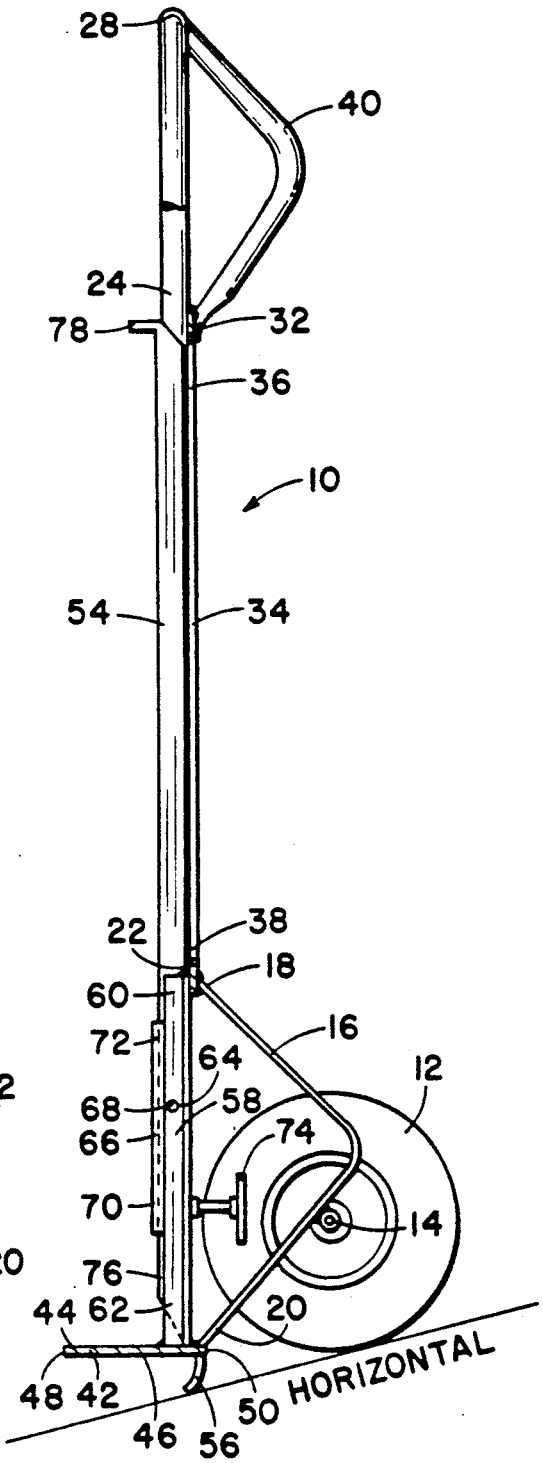
FIG. 2 is a side view of a device for lifting manhole covers taken along line 2—2 of FIG. 1.

Referring to the drawings and initially to FIGS. 1 and 2, there is illustrated a device for lifting manhole covers generally designated by the reference numeral 10. The device 10 rolls on two wheels 12 which attach to an axle 14 having two ends, one wheel attached at each end. The axle 14 attaches near each of its ends to two L-shaped bars 16.

The L-shaped bars 16 each have an upper end 18 and a lower end 20. The upper ends 18 of the L-shaped bars 16 attach to a lower horizontal bar 22. The lower horizontal bar 22 has two ends which attach to an inverted U-shaped frame 24, the frame having two arms 26 extending downward from an upper curved end 28, said arms 26 terminating at two lower ends 30.

The lower horizontal bar 22 attaches to the arms 26 of the frame 24 at a point approximately one-third the length of the frame 24 from the two lower arm ends 30.

An upper horizontal bar 32, having two ends, attaches by its ends to the arms 26 of the frame 24 at points approximately two-thirds the length of the frame 24 from the lower arm ends 30. A median vertical bar 34 having an upper end 36 and a lower end 38 attaches on its upper end 36 to the upper horizontal bar 32 midway between the frame arms 26 and attaches on its lower end 38 to the lower horizontal bar 22. A L-shaped handle 40 having two ends attaches by one end to the upper curved end 28 of the frame 24 midway between the frame arms 26 and attaches by its other end to the upper horizontal bar 32 midway between the frame arms 26.

The lower ends 20 of the L-shaped bars 16 are attached to a bottom plate 42. The bottom plate 42 has a top side 44, a bottom side 46, a front edge 48 and a back edge 50. The lower ends 30 of the frame 24 attach to the top side 44 of the bottom plate 42 near the back edge 50 adjacent to the L-shaped bars 16, with the L-shaped bars 16 located between the lower ends 30 of the frame 24. The bottom plate 42 has a slot 52 in its front edge 48 large enough to admit a lifting bar 54. A tail 56 is attached medially near the back edge 50 on the bottom side 46 of the bottom plate 42.

Two lower parallel vertical bars 58, made of angle iron or similar material, each having an upper end 60 and a lower end 62, are attached to the bottom plate 42 at their lower ends 62, the lower ends 62 being spaced apart and located between the L-shaped bars 16.

The upper ends 60 of the lower parallel vertical bars 58 attach to the lower horizontal bar 22, the upper ends 60 being spaced apart. The lower parallel vertical bars 58 each have a hole 64 through the bars 58, the holes 64 being aligned with each other and oriented perpendicular to the axis of the lower parallel vertical bars 58.

A pivotal sleeve 66 is positioned between the lower parallel vertical bars 58 and pivots on ears 68, which are attached to the sides of the sleeve 66 and which extend through the holes 64 in the lower parallel vertical bars 58. The sleeve 66 has a longer end 70 which lies between the ears 68 and the bottom plate 42, and a shorter end 72, which lies between the ears 68 and the lower horizontal bar 22. The sleeve 66 has a T-top threaded bolt 74 on the longer end 70 of the sleeve 66. The bolt 74 extends through a side of the sleeve 66 which faces the axle 14.

Referring to FIG. 8, a lifting bar 54 slides into the sleeve 66 and is secured in place by tightening the T-top threaded bolt 74 against the lifting bar 54.

Referring to FIG. 3, the lifting bar 54 has two ends, a pointed end 76 and a finger end 78.

The lifting bar 54 can be placed in the sleeve 66 in two different configurations.

Figure 5:
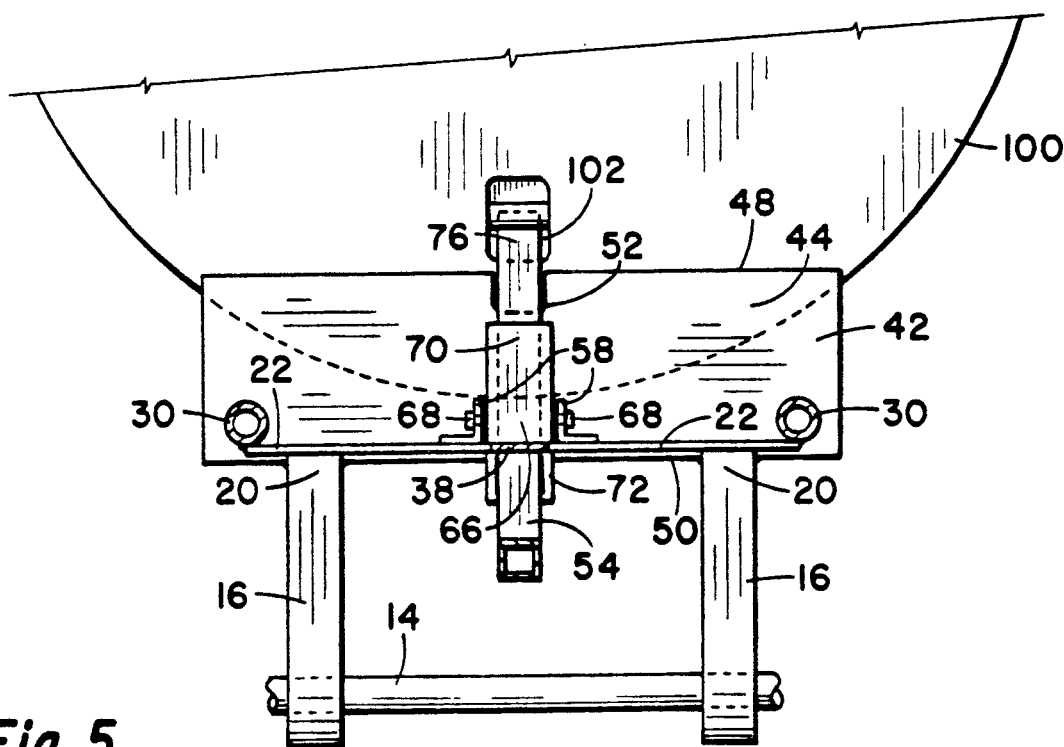
FIG. 5 is a cross-sectional view of a device for lifting manhole covers taken along line 5—5 of FIG. 4.

FIGS. 4 and 5 illustrate the first configuration. This configuration has the pointed end 76 of the bar 54 inserted in the sleeve 66 so the pointed end 76 rests in the longer end 70 of the sleeve 66. In this placement, the device 10 can be used to lift a small manhole cover 100 by inserting the pointed end 76 of the lifting bar 54 into a recess 102 for engagement of the small manhole cover 100 and tilting the device 10 backward onto the wheels 12. When tilted in this fashion, the lifting bar 54 rests in a slot 52 on the bottom plate 42 and raises the manhole cover 100 which can then be wheeled away to its intended destination.

Figure 7:
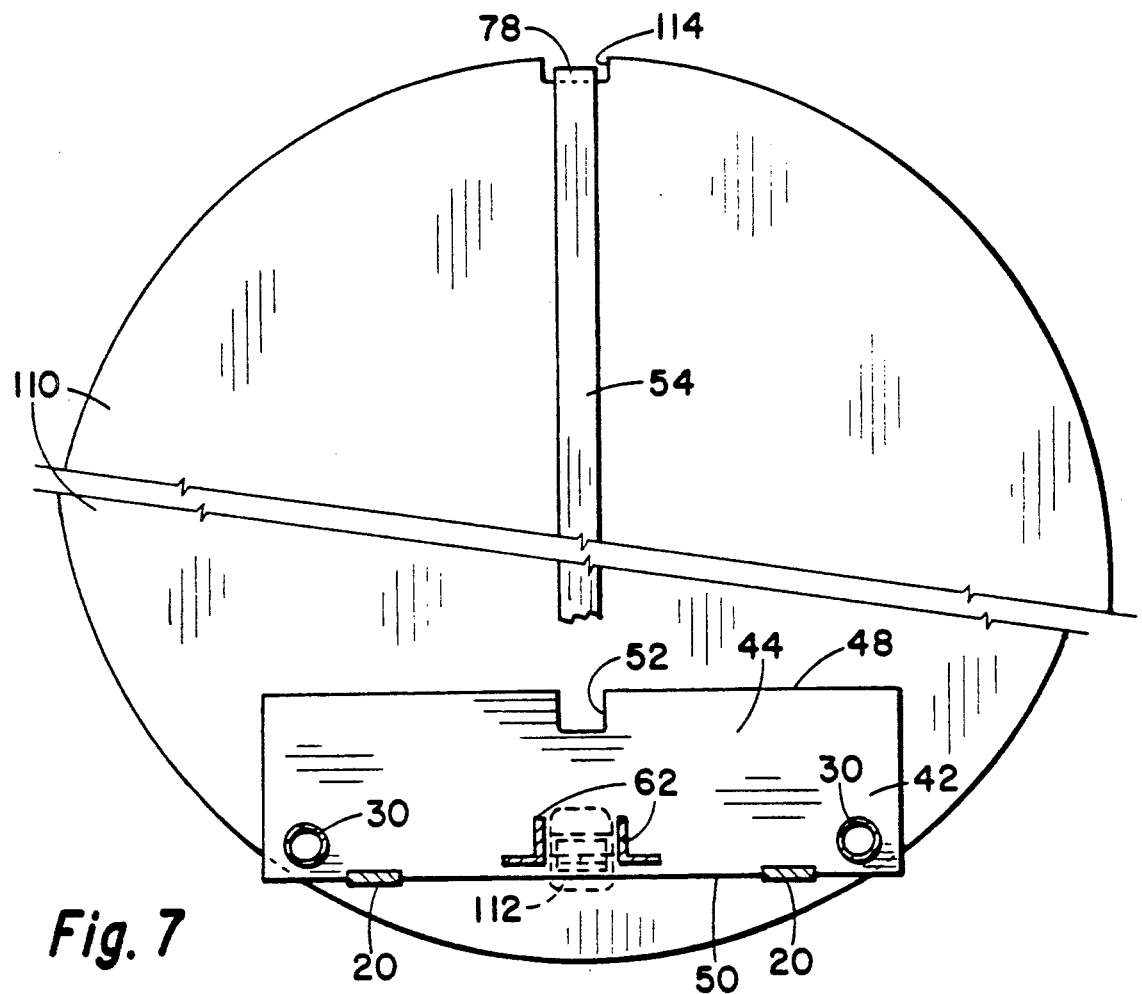
FIG. 7 is a cross-sectional view of a device for lifting manhole covers taken along line 7—7 of FIG. 6.

FIGS. 6 and 7 illustrate the second configuration. This configuration places the finger end 78 of the bar 54 in the sleeve 66 so the finger end 78 rests in the longer end 70 of the sleeve 66.

In this second configuration, the device 10 can be used in two different ways to lift a large manhole cover 110.

The first way of using the device 10 in the second configuration, generally used for large manhole covers which do not have a locking lip on their lower edge, inserts the tail 56, located on the bottom side 46 of the bottom plate 42, into a recess 112 for engagement of the large manhole cover 110, then places the finger end 78 in a side slot 114 in the large manhole cover 110 opposite from the recess 112 and finally tilts the device 10 backward onto the wheels 12, thus lifting the large manhole cover 110.

A second way of using the device 10 in the second configuration, which is generally used for large manhole covers which do have locking lips on their lower edge, inserts the tail 56 into the side slot 114, places the finger end 78 into recess 112 and tilts the device 10 backward onto the wheels 12 to lift the large manhole cover 110.

Whereas the present invention has been disclosed in terms of the specific structure described above, it should be understood that other and further modifications, apart from those shown or suggested herein, may be made within the spirit and scope of this invention.

What is claimed is:

1. A device for lifting and moving small and large manhole covers comprising a frame having an upper end, two side arms, and a lower end where the two side arms terminate, an axle with wheels connected to the frame at the lower end of the frame, a bottom plate attached to the lower end of the frame, said plate having a front edge, back edge, top side and bottom side, a pivotal sleeve mounted near the lower end of the frame, a threaded bolt extending into the sleeve, a reversible lifting bar having a pointed end and a finger end slidably received in the sleeve, said lifting bar being adjusted to fit the manhole cover and tightened in place by the threaded bolt.

2. A device according to claim 1 wherein the frame is an inverted U-shape.

3. A device according to claim 1 wherein the front edge of the bottom plate is provided with a slot into which the lifting bar can be placed when lifting a manhole cover.

4. A device according to claim 1 further comprising a lower horizontal bar with two ends, said lower horizontal bar attached on its ends to the side arms of the frame near its lower end, two lower parallel vertical bars each containing a hole therein and each having an upper end and a lower end, said lower parallel vertical bars being spaced apart from each other and attached on their upper end to the lower horizontal bar and attached on their lower end to the top side of the bottom plate, the pivotal sleeve mounted between the two lower parallel vertical bars, said pivotal sleeve having ears which extend through the holes in the lower parallel vertical bars, two L-shaped bars each having two ends, said L-shaped bars attached on one end to the lower horizontal bar at a location adjacent to the frame and attached by the other end to the top side of the bottom plate at a location adjacent to the frame, the axle being attached to the L-shaped bars.

5. A device according to claim 1 further comprising an upper horizontal bar with two ends, said upper horizontal bar attached by its ends to the side arms of the frame near the upper end of the frame, a median vertical bar having two ends, said median vertical bar attached by one end to the upper horizontal bar midway between the frame arms and attached by the other end to the lower horizontal bar midway between the frame arms, an L-shaped handle having two ends, said handle attached by one end to the upper horizontal bar midway between the frame arms and attached by its other end to the upper end of the frame midway between the frame arms.

6. A device according to claim 1 further comprising a slot provided in the front edge of the bottom plate into which the lifting bar can be placed when lifting a manhole cover with the pointed end, a tail means provided on the bottom side of the bottom plate which engages the manhole cover when lifting the manhole cover with the finger end.

* * * * *